United States Patent
Mao et al.

(10) Patent No.: US 8,917,001 B2
(45) Date of Patent: Dec. 23, 2014

(54) GEAR MOTOR ASSEMBLY

(75) Inventors: Wei Xing Mao, Rochester Hills, MI (US); Xiao Liang Yue, Shenzhen (CN); Fan OuYang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 260 days.

(21) Appl. No.: 13/571,674

(22) Filed: Aug. 10, 2012

(65) Prior Publication Data

US 2013/0038156 A1 Feb. 14, 2013

(30) Foreign Application Priority Data

Aug. 10, 2011 (CN) .......................... 2011 1 0228803

(51) Int. Cl.
*H02K 7/116* (2006.01)
*H01R 39/415* (2006.01)
*H02K 13/10* (2006.01)

(52) U.S. Cl.
CPC .............. *H01R 39/415* (2013.01); *H02K 7/116* (2013.01); *H02K 13/10* (2013.01)
USPC .............................................. 310/90; 310/83

(58) Field of Classification Search
USPC ..................................................... 310/83, 90
IPC .......................................... H02K 7/116,5/1672
See application file for complete search history.

(56) References Cited

U.S. PATENT DOCUMENTS

| | | | | |
|---|---|---|---|---|
| 5,169,245 A | * | 12/1992 | Harada et al. ................. | 384/610 |
| 5,212,999 A | * | 5/1993 | Kitada ............................ | 74/425 |
| 5,399,025 A | * | 3/1995 | Higuchi et al. ............... | 384/428 |
| 5,747,903 A | * | 5/1998 | Klingler ...................... | 310/75 R |
| 5,777,411 A | * | 7/1998 | Nakajima et al. ............... | 310/83 |
| 5,977,682 A | * | 11/1999 | Clemente ..................... | 310/239 |
| 2010/0225198 A1 | * | 9/2010 | Lau et al. ..................... | 310/248 |
| 2010/0320857 A1 | * | 12/2010 | Mizutani ........................ | 310/83 |

* cited by examiner

*Primary Examiner* — Dang Le
(74) *Attorney, Agent, or Firm* — Muncy, Geissler, Olds & Lowe, P.C.

(57) ABSTRACT

A gear motor assembly includes a gearbox, a motor mounted to the gearbox, a first damper and a second damper. The gearbox includes a gearing casing and a worm gear installed in the gear casing. The motor includes a stator and a rotor. The stator includes a housing. The rotor includes a motor shaft and a worm integrally rotating with the shaft. The shaft extends into the gear housing and the worm is meshed with the worm gear. The first damper is sandwiched between the gear casing and a first end of the shaft, eliminating end play between the shaft and the gear casing. The second damper is sandwiched between the motor housing and a second end of the shaft, eliminating end play between the shaft and the motor housing.

14 Claims, 4 Drawing Sheets

GEAR MOTOR ASSEMBLY

CROSS REFERENCE TO RELATED APPLICATIONS

This non-provisional patent application claims priority under 35 U.S.C. §119(a) from Patent Application No. 201110228803.9 filed in The People's Republic of China on Aug. 10, 2011.

FIELD OF THE INVENTION

This invention relates to a gear motor assembly and in particular to a gear motor assembly having shaft end play control.

BACKGROUND OF THE INVENTION

A gear motor assembly, such as a window lift drive used in a vehicle to raise or lower a window, typically includes a bidirectional motor and a gearbox. The gearbox includes a casing and a gear train in the form of a worm and worm gear disposed in the casing. The motor includes a stator and a rotor. The stator includes a housing and permanent magnets attached to an inner surface of the housing. The rotor is rotatably disposed in the stator. The rotor includes a motor shaft, a core and a commutator fixed to the shaft. The shaft extends into the gearbox casing and has a worm which is meshed with the worm gear to rotate the worm gear, and thus a load attached to the worm gear. Two axial ends of the motor shaft are respectively spaced from either of the motor housing or the gear casing. When the motor changes the direction of rotation, axial vibrations of the motor shaft are created, which may damage the worm gear.

Therefore, there is a desire for an improved gear motor assembly in which end play is eliminated or closely controlled to avoid damage to the worm gear due to axial vibrations of the motor shaft.

SUMMARY OF THE INVENTION

Accordingly, the present invention provides a gear motor assembly comprising: a gearbox comprising a gear casing and a worm gear disposed in the gear casing; and motor mounted to the gearbox, the motor comprising: a stator comprising a housing; a rotor received in the housing of the stator, the rotor comprising a motor shaft, the motor shaft extending in the gear casing; a worm fixed to the motor shaft and disposed within the gear casing in mesh with the worm gear; a first damper sandwiched between an inner surface of the gear casing and a first axial end of the motor shaft remote from the motor, the first damper eliminating end play between the motor shaft and the gear casing; and a second damper sandwiched between an inner surface of the motor housing and a second axial end of the motor shaft remote from the gearbox, the second damper eliminating end play between the motor shaft and the motor housing.

Preferably, the first damper comprises a rubber pad and a thrust cap, the thrust cap is sandwiched between the first axial end of the motor shaft and the rubber pad, and the rubber pad abuts against the inner surface of the gear casing.

Preferably, the first damper further comprises a holding portion fixedly located in the gear casing, the rubber pad and the thrust cap are disposed in the holding portion.

Preferably, the second damper comprises a rubber pad abutting against the inner surface of the motor housing, and a thrust cap sandwiched between a second axial end of the motor shaft and the rubber pad.

Preferably, a tube portion is formed in the motor housing and the second damper is disposed within the tube portion, the thrust cap of the second damper has a diameter substantially equal to an inner diameter of the tube portion.

Preferably, the rotor comprises a commutator fixed to the motor shaft, and the motor further comprises a plurality of brushes slidably contacting the commutator and a plurality of springs, each spring generating a force to urge a corresponding brush into contact with the commutator, each brush having a lengthwise axis inclined to a rotational axis of the commutator at a first angle between 75° to 87°, and a second angle defined between the force and the rotational axis of the commutator is greater than the first angle.

Preferably, the force is substantially perpendicular to the rotational axis of the commutator.

Preferably, the first angle is between 80° to 83°, most preferably, between 81.5° to 82.5°.

Preferably, each brush is received in a respective brush holder, each brush holder has a bottom surface arranged to slidably support the brush, and the bottom surface is inclined to the rotational axis of the commutator.

Preferably, each brush is received in a corresponding brush holder, each brush holder has a chamber to slidably receive the brush, and the brush holder has a resilient arm extending in the chamber and urging the brush against one side of the chamber.

Preferably, each brush has a contact face adapted to contact the commutator, the contact face is inclined to the rotational axis of the commutator.

Preferably, each brush has an end face that is directly contacted by the corresponding spring, the end face being substantially parallel to the rotational axis of the commutator.

Preferably, clearance between each brush and the chamber of the corresponding brush holder is between 4% and 10% of the relevant dimension of the brush.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
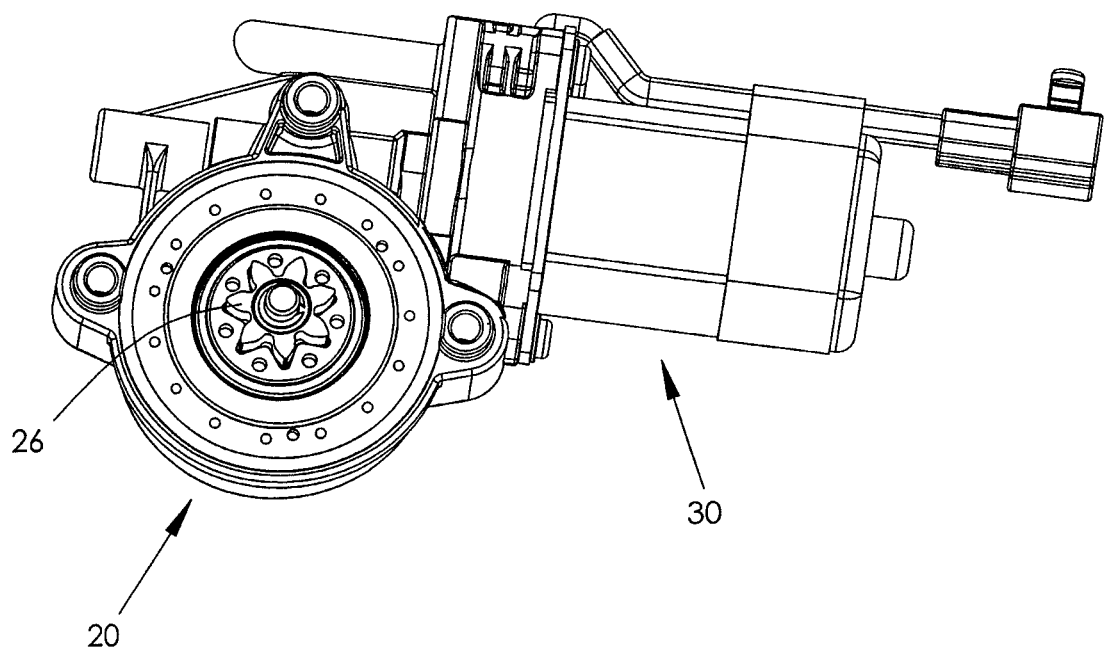
FIG. 1 is an assembled, isometric view of a gear motor assembly according to an exemplary embodiment of the present invention.
Figure 2:
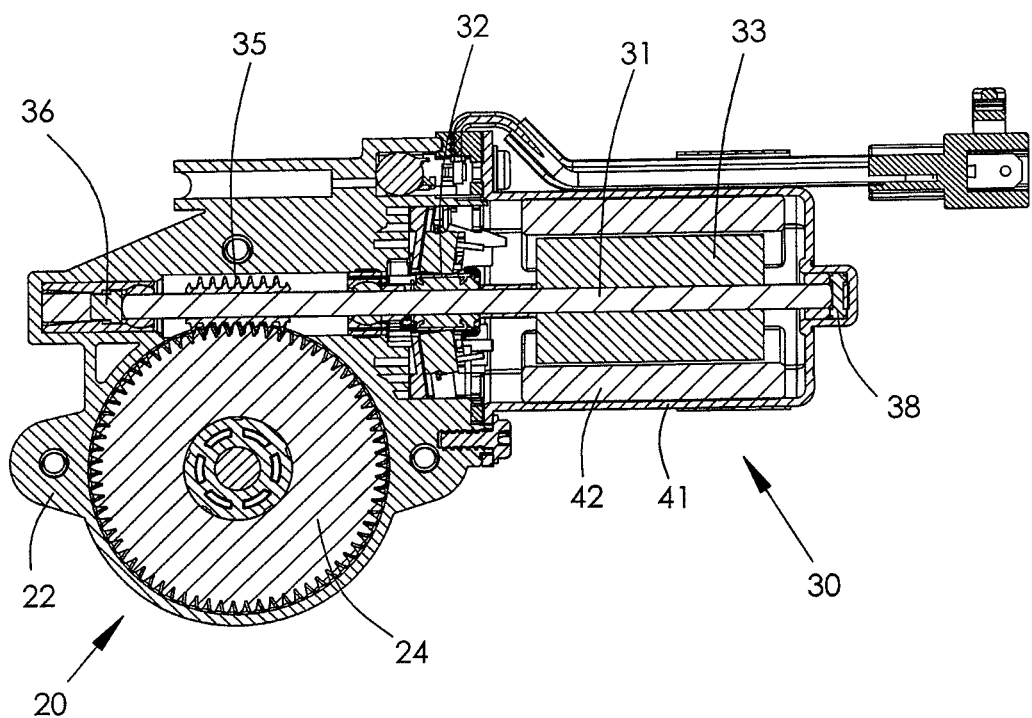
FIG. 2 is a sectional view of the gear motor assembly of FIG. 1.

Referring to FIGS. 1 and 2, the gear motor assembly according to an exemplary embodiment of the present invention is shown. The gear motor assembly can be a window lift drive used in a vehicle to raise or lower a window.

The gear motor includes a gearbox 20 and a motor 30 mounted to the gearbox 20. The gearbox 20 includes a gear casing 22, a worm gear 24 installed in the gear casing 22, and an output device (26) mounted to the worm gear 24. The motor 30 is a bidirectional motor.

The motor 30, in this embodiment, is a permanent magnet DC motor. The motor 30 includes a stator and a rotor. The stator includes a motor housing 41 with an open end at one axial end thereof, permanent magnets 42 mounted to an inner surface of the motor housing 41, and a brush assembly fixedly located at the open end of the motor housing 41. The rotor is received in the motor housing 41 and is rotatable with respect to the stator. The rotor includes an shaft 31, a commutator 32 and a rotor core 33 fixed on the shaft 31, and a worm 35 rotating with the shaft 31.

The worm 35 may be a cog fixed to the motor shaft 31. Alternatively, the worm 35 can be integrally formed with the motor shaft 31 as a monolithic construction by, for example, cutting or rolling. In this embodiment, the worm 35 is a separate cog which is press fitted onto the motor shaft 31. The worm 35 is meshed with the worm gear 24, so as to drive an output device 26 via the worm gear 24.

Figure 3:
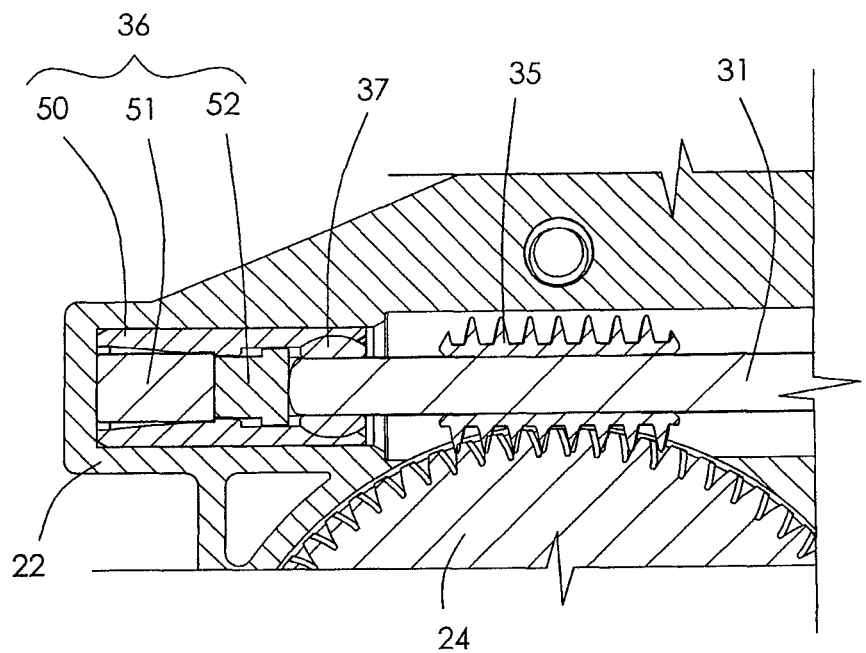
FIG. 3 is an enlarged view of a portion of the gear motor assembly of FIG. 2.
Figure 4:
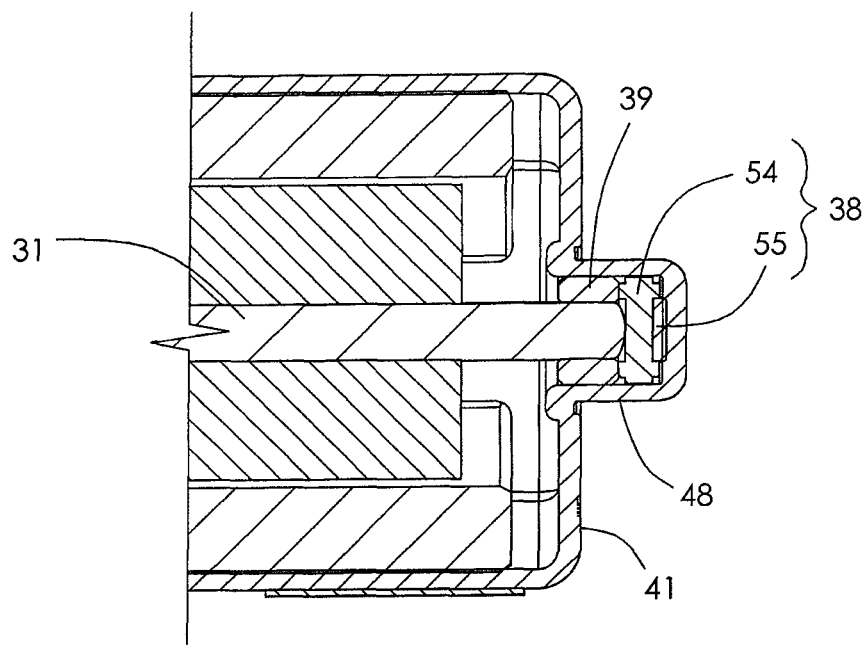
FIG. 4 is an enlarged view of another portion of the gear motor assembly of FIG. 2.

Referring also to FIGS. 3 and 4, one axial end of the motor shaft 31, remote from the motor 30, abuts against the gear casing 22 via a first damper 36. The other axial end of the motor shaft 31 abuts against the motor housing 41 via a second damper 38, such that axial vibration of the motor shaft 31 is absorbed by the first and second dampers 36 and 38.

The first damper 36 is mounted to an inner side of the gear casing 22 and located between the gear casing 22 and the axial end of the motor shaft 31, to eliminate end play therebetween. The first damper 36 includes a holding portion 50 fixedly located in the gear casing 22, a rubber pad 51 and a thrust cap 52 received in the holding portion 50. In this embodiment, the holding portion 50 is in the form of a hollow tube, and defines two open ends at opposite axial ends thereof. The holding portion 50 is fittedly received in the gear casing 22. The rubber pad 51 is received in the holding portion 50 and abuts against the inner surface of the gear casing 22. The thrust cap 52 is then received in the holding portion 50 and abuts against the rubber pad 51, such that the rubber pad 51 is sandwiched between the thrust cap 52 and the inner surface of the gear casing 22. A first bearing 37 is also received in the holding portion 50 and located adjacent to but spaced from the thrust cap 52. The motor shaft 31 is supported by the first bearing 37. A first axial end of the motor shaft 31 abuts against the thrust cap 52.

The first damper 36 is sandwiched between the first end of the motor shaft 31 and the inner surface of the gear casing 22, eliminating end play between the first end of the motor shaft 31 and the gear casing 22. Further, the rubber pad 51 functions as a damper which absorbs axial vibration of the motor shaft 31 when the direction of rotation changes.

The second damper 38 is mounted to the inside of the motor housing 41, and located between the motor housing 41 and a second axial end of the motor shaft 31, to eliminate end play there between. The motor housing 41 forms a tube portion 48 for receiving the second damper 38. The second damper 38 includes a thrust cap 54 and a rubber pad 55. The thrust cap has an outer diameter substantially the same as an inner diameter of the tube portion 48 of the motor housing 41, such that the thrust cap 54 is a press fit within the tube portion 48. The rubber pad 55 is placed in the tube portion 48 with one face abutting against the inner end of the tube portion 48. The thrust cap 54 is then pressed into the tube portion 48 and abuts against an opposite face of the rubber pad 55, such that the rubber pad 55 is sandwiched between the thrust cap 54 and the inner surface of the tube portion 48. Preferably the rubber pad 55 is received in a cavity formed by a recess in the thrust cap and a recess formed in the end of the tube portion 48. A second bearing 39 is also received in the tube portion 48 and located adjacent to the thrust cap 54. The motor shaft 31 is supported by the second bearing 39, and the second end of the motor shaft 31 abuts against the thrust cap 54. Due to the second damper 38, end play between the second end of the motor shaft 31 and the motor housing 41 is eliminated. In addition, the rubber pad 55 functions as a damper which absorbs axial vibration of the motor shaft 31 when the motor shaft 31 changes direction of rotation.

Figure 5:
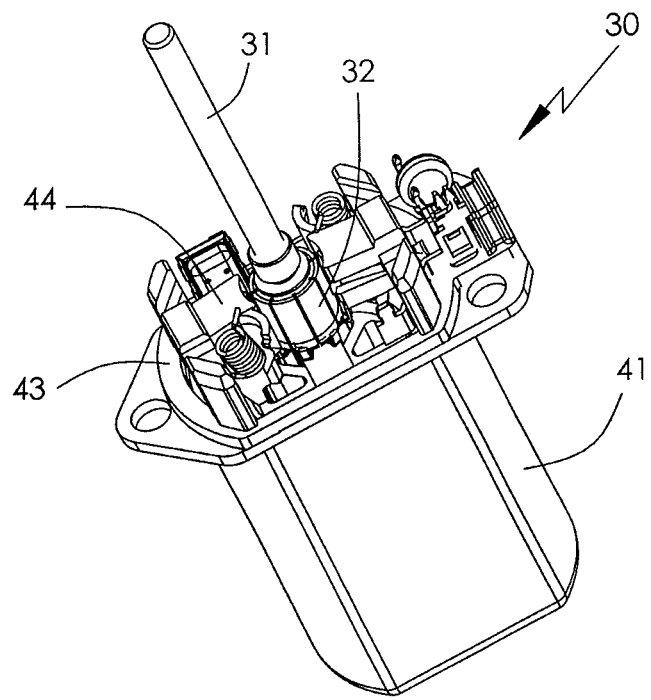
FIG. 5 shows a motor of the gear motor assembly of FIG. 1.
Figure 6:
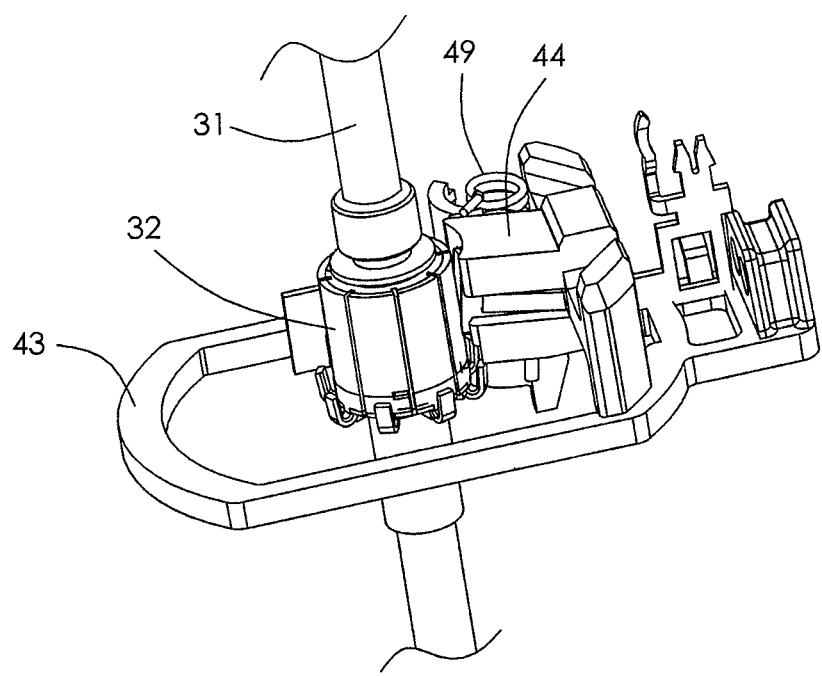
FIG. 6 shows a commutator and brush of the motor of FIG. 5.
Figure 7:
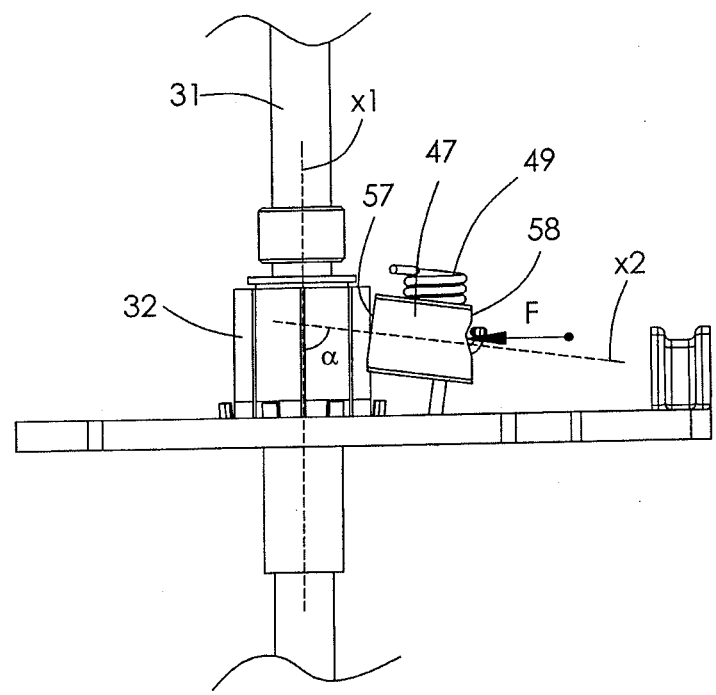
FIG. 7 is a side view of the commutator and brush shown in FIG. 6.

Referring to FIGS. 5 through 7, a seal 43 is provided at the interface of the motor housing 41 and the gear casing 22, to seal the motor housing to the gear casing.

The brush assembly includes a plurality of brush holders 44 each defining a chamber therein, a plurality of brushes 47 slidably received in respective chambers of the brush holders 44, and springs 49, each of which is arranged to urge a corresponding brush 47 towards the commutator 32. In this embodiment, each spring 49 is a torsion spring.

As the brush assemblies is substantially identical, one brush assembly will now be described in detail by way of example. The chamber of the brush holder 44 includes a bottom surface 45 to support a bottom of the brush 47. The bottom surface 45 of the brush holder 44 is inclined to a rotational axis x1 of the commutator 32 at an angle α between 75° to 87°. That is to say, a lengthwise axis x2 of the brush 47 is inclined to the rotational axis x1 of the commutator 32 by the angle α. The angle α is preferably between 80° to 83°, and in this embodiment, the angle α is between 81.5° to 82.5°.

A force F acts on an outer end of the brush 47 by the spring 49 to urge the brush 47 towards the commutator 32. A second angle defined between the force F and the rotational axis x1 of the commutator 32 is greater than the angle α. Preferably, the second angle is substantial 90°, in other words, the force F is substantially perpendicular to the rotational axis x1 of the commutator 32. The outer end of the brush 47 has an end face 58 which the spring 49 directly contacts. The end face 58 of the brush 47 is substantially perpendicular to the force F. That is, the end face 58 of the brush 47 is substantially parallel to the rotational axis x1 of the commutator 32, as shown in FIG. 7.

As the brush 47 wears, the spring 49 urges the brush 47 towards the commutator 32 to assure good contact between the brush 47 and the commutator 32. Since an inner end of the brush 47 is inclined to the commutator 32, a contact face 57 of the brush 47, inclined to the rotational axis x1 of the commutator 32, gradually increases while the brush 47 wears, which produces a low starting torque when the motor 30 starts.

Figure 8:
FIG. 8 is a force vector diagram showing the components of the force acting on the brush of FIG. 7.

Referring to FIG. 8, the force F can be divided into a first component F1 along the length of the brush 47, i.e., the lengthwise axis x2 of the brush 47, and a second component F2 perpendicular to the length of the brush 47. The second component F2 eliminates any up and down vibration of the brush 47 which is caused by thread traces on the surface of the commutator 32 formed during manufacturing.

Figure 9:
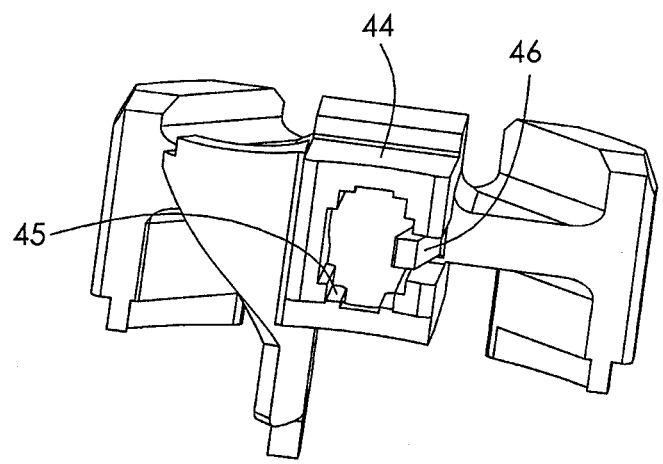
FIG. 9 is an isometric view of a brush holder of the motor of FIG. 5.

Referring to FIG. 9, a resilient arm 46 is formed at one side of each brush holder 44. The resilient arm 46 extends into the chamber and urges the brush 47 against one side of the chamber, thereby eliminating vibration of the brush 47 from side to side. In addition, due to the resilient arm 46, a greater clearance between the brush 47 and the chamber is allowed, thus preventing stuck brush or hung brush due to thermal expansion of the brush 47 during operation. In this embodiment, the brush holder 44, and the resilient arm 46 are integrally formed as a monolithic construction by a single molding, such as injection molding.

Due to the resilient arm, the clearance between the brush and the chamber of the brush holder may be increased over prior art designs. Previously, the clearance was required to be as small as possible to provide a stable brush position to avoid sparking and erratic motor performance as vibrations caused the position of the contact between the brush and the commutator to change. However, small clearances lead to the brush being hung up or jammed in the chamber due to thermal expansion of the brush during heavy use or from build up of brush dust and other debris. Generally the clearance would be between 1% and 4% of the relevant brush dimension, i.e., width or height. However, with the resilient arm, this clearance can be increased to more than 4%, but preferable to 10% or less. Similarly, the use of the inclined sliding surface of the chamber and the direction of the force of the spring, the clearance between the brush and the chamber in the height direction of the brush or axial direction of the motor, can be increased to between 4% an 10% as well. This means that the brush assembly is less affected by large changes in the operating temperature of the brushes.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A gear motor assembly comprising:
 a gearbox comprising a gear casing and a worm gear disposed in the gear casing; and
 a motor mounted to the gearbox, the motor comprising:
  a stator comprising a housing:
  a rotor received in the housing of the stator, the rotor comprising a motor shaft, the motor shaft extending in the gear casing;
  a worm fixed to the motor shaft and disposed within the gear casing in mesh with the worm gear;
  a first damper sandwiched between an inner surface of the gear casing and a first axial end of the motor shaft remote from the motor, the first damper eliminating end play between the motor shaft and the gear casing; and
  a second damper sandwiched between an inner surface of the motor housing and a second axial end of the motor shaft remote from the gearbox, the second damper eliminating end play between the motor shaft and the motor housing,
 wherein the first damper comprises a rubber pad and a thrust cap, the thrust cap is sandwiched between the first axial end of the motor shaft and the rubber pad, and the rubber pad abuts against the inner surface of the gear casing, and
 wherein the first damper further comprises a holding portion fixedly located in the gear casing, the rubber pad and the thrust cap are entirely disposed in the holding portion.

2. The gear motor assembly of claim 1, wherein the second damper comprises a rubber pad abutting against the inner surface of the motor housing, and a thrust cap sandwiched between a second axial end of the motor shaft and the rubber pad.

3. The gear motor assembly of claim 2, wherein a tube portion is formed in the motor housing and the second damper is disposed within the tube portion, the thrust cap of the second damper has a diameter substantially equal to an inner diameter of the tube portion.

4. The gear motor assembly of claim 3, wherein the thrust cap of the second damper defines a first recess and the tube portion of the motor housing defines a second recess facing the first recess, the rubber pad of the second damper is received in a cavity defined by the first recess and the second recess.

5. The gear motor assembly of claim 1, wherein the rotor comprises a commutator fixed to the motor shaft, and the motor further comprises a plurality of brushes slidably contacting the commutator and a plurality of springs, each spring generating a force to urge a corresponding brush into contact with the commutator, each brush having a lengthwise axis inclined to a rotational axis of the commutator at a first angle between 75° to 87°, and a second angle defined between the force and the rotational axis of the commutator is greater than the first angle.

6. The gear motor assembly of claim 5, wherein the force is substantially perpendicular to the rotational axis of the commutator.

7. The gear motor assembly of claim 5, wherein the first angle is between 80° to 83°.

8. The gear motor assembly of claim 5, wherein the first angle is between 81.5° to 82.5°.

9. The gear motor assembly of claim 5, wherein each brush is received in a respective brush holder, each brush holder has a bottom surface arranged to slidably support the brush, and the bottom surface is inclined to the rotational axis of the commutator.

10. The gear motor assembly of claim 5, wherein each brush is received in a corresponding brush holder, each brush holder has a chamber to slidably receive the brush, and the brush holder has a resilient arm extending in the chamber and urging the brush against one side of the chamber.

11. The gear motor assembly of claim 10, wherein clearance between each brush and the chamber of the corresponding brush holder is between 4% and 10% of the relevant dimension of the brush.

12. The gear motor assembly of claim 5, wherein each brush has a contact face adapted to contact the commutator, the contact face is inclined to the rotational axis of the commutator.

13. The gear motor assembly of claim 5, wherein each brush has an end face that is directly contacted by the corresponding spring, the end face being substantially parallel to the rotational axis of the commutator.

14. The gear motor assembly of claim 1, further comprising a first bearing supporting the first axial end of the motor shaft, wherein the first bearing is received in the holding portion, and the first axial end of the motor shaft extends through the first bearing to abut against the thrust cap.

* * * * *